United States Patent

Neu

Patent Number: 5,248,025
Date of Patent: Sep. 28, 1993

[54] DISTRIBUTION CONE FEEDING DEVICE

[76] Inventor: Horst W. Neu, 22615 Fern Ave., Torrance, Calif. 90505

[21] Appl. No.: 981,389

[22] Filed: Nov. 25, 1992

[51] Int. Cl.$^5$ .............................................. B65G 47/12
[52] U.S. Cl. ................................. 198/454; 198/392
[58] Field of Search ................. 198/392, 443, 453–455

[56] References Cited

U.S. PATENT DOCUMENTS 2,881,897  4/1959  Thulke ........................... 198/453
3,357,536  12/1967  Kelly ............................... 198/454

FOREIGN PATENT DOCUMENTS 1495053  7/1989  U.S.S.R. ............................ 198/454

Primary Examiner—Joseph E. Valenza

[57] ABSTRACT

A device to facilitate the feeding of a supply of parts from the flat central area of powered feeders to a predetermined exit point at the perimeter of the feeder. The device is comprised of the distribution cone and retaining means placed on and in the powered feed table. The cone is fixed in a off-center position in the feed table by means of a shaft attached to the cone that rides in a adjustable bearing block where it is free to rotate but not move laterally. The bearing block is mounted on a stationary support that comprises a tube and/or a rod with fixed end plates that mount permanently on the base of a powered feed table. The rod of one support is fitted into the tube of the other support thereby allowing the use of the assembly on various width and diameters of feed tables. When the cone is fixed in the proper position, parts that are carried on the feed table surface will be guided along the edge or over the cone to the perimeter of the feed table and from there to the exit.

8 Claims, 4 Drawing Sheets

DISTRIBUTION CONE FEEDING DEVICE

BACKGROUND OF THE INVENTION

Field of the Invention

This invention generally pertains to a method of moving and feeding of parts in a single row to it's following operations.

The invention relates to methods and devices that cause parts to be transported to the periphery of powered rotary feed tables.

Description of Related Art

Manufacturing operations in small and large assembly plants use a variety of feed tables to load parts into assembly machines or for queuing parts between assembly machines to allow a buffer of parts. Three major systems are used to feed parts in these operations:

1) Vibratory Feeders: The vibratory feeders have limitations when parts are constantly vibrated and rubbing together, thereby generating residue due to abrasion of parts. Vibratory feeders further have a very high noise level.

2) Rotary Feeders: They are lower in cost and lend themselves for a gentler handling of parts and quiet operation. These later are used in large quantity in the bearing assembly operations of rolling element bearing manufacturers. One hinderance to the wider use of these rotary feed tables has been the tendency of parts to stay in the center of tables and not be fed out to the peripheral exit tracks. To overcome this limitation, various devices have been incorporated with limited success. The most widely utilized devices are a variety of paddles with springs that are allowed to rotate out of the way when the load is large and let the springs push the parts to the periphery as the volume of parts becomes less. However, success is limited because of spring breakage and jamming of parts at various load levels in the feed table.

3) Gravity Feeders: In these devices, gravity is used to tumble and orient parts until the parts are oriented and aligned at an exit position from where the parts are feed to the point of use.

SUMMARY OF THE INVENTION

To avoid the limitations and problems with present methods of feeding parts with rotary feeders, it is an object of the subject invention to urge parts from the central portion of the feeder to the periphery and from there to an exit.

An object of the invention is to reduce labor by eliminating jamming of parts.

Another object is to improve feeding performance by allowing larger part loads in the feeder.

Another object of the invention is to provide maintenance free operation.

Another object of the invention is the elimination of the need for external or additional power.

An object of the invention is to provide a device that has an extended service life.

Another object of the invention is a clean operation.

Another object of the invention is that it silent operation.

These and other objects of the invention are provided by a novel distribution cone used with a parts feed table. The present invention overcomes all limitations of the previous methods in these rotary feed tables. The distribution cone is only one moving part that is free to rotate or under the influence of the parts sliding over the surface or by the effect of the differential speed of the central part and the outer part of the turn table whereon the cone rests. This rotation eliminates totally any jamming and assures that all parts are moved to the periphery for feeding out of the peripheral exit guide and track. The distribution cone may be used equally as well in other than the described powered feeders.

DESCRIPTION OF THE PREFERRED EMBODIMENT

Figure 1:
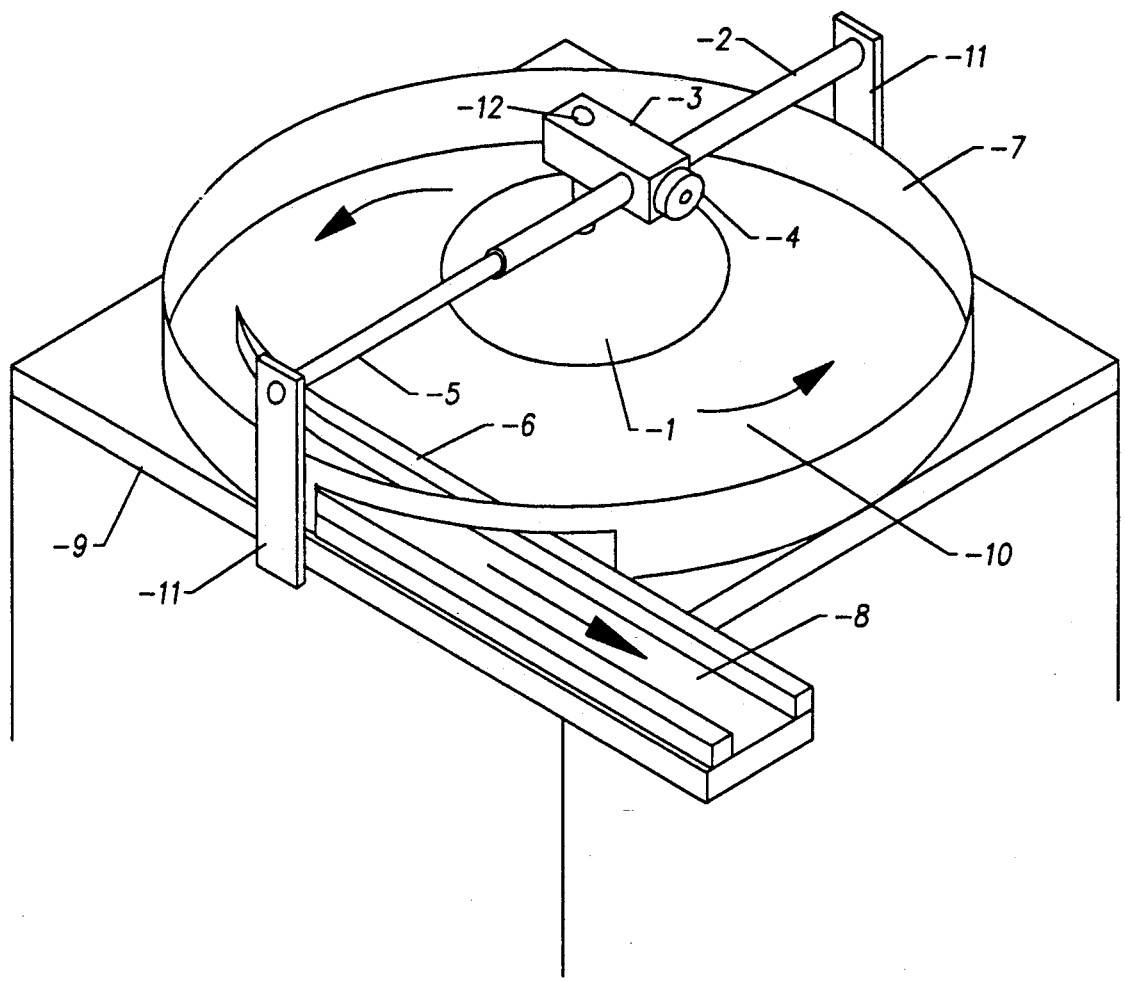
FIG. 1: is a perspective illustration of a typical rotary feed table constructed incorporating the present invention with individual parts identified.

Shown in the drawings, with particular reference to FIG. 1, there is illustrated a distribution cone feeding device with its major components in a typical installation on a rotary feed table. A cone 1 with affixed shaft 12 for urging round or cylindrical parts to the perimeter of a rotating disk 10 being a part of a rotary feed table being supported by base 9. Base 9 supports rotary disk 10 surrounded by skirt 7 with exit guide 6 and exit track 8. Rigidly attached to base 9 are flat side bars 11, one having rigidly attached bar 5, the other having tube 2 rigidly attached. Bar 5 sliding freely into tube 2. A bearing block 3 being fixed horizontally by a locking means 4 at a convenient location along tube 2 or bar 5. Bearing block 3 having at its extended end a vertical bore comprising a bearing receiving shaft 12 with affixed cone 1. Said bore or bearing permitting free rotation and vertical movement thereby permitting Cone 1 to rest by its own weight on the surface of rotating disk 10.

Figure 2:
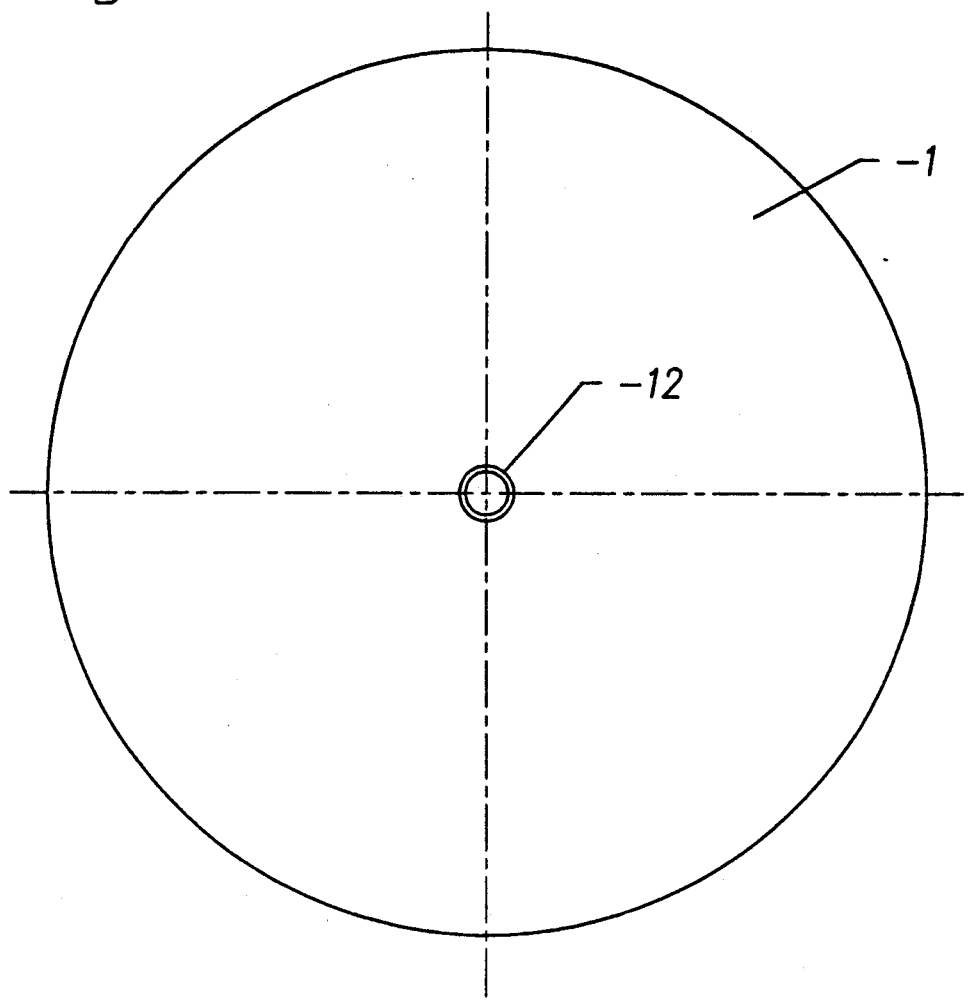
FIG. 2: is a plan view of a typical distribution cone assembly.
Figure 2A:
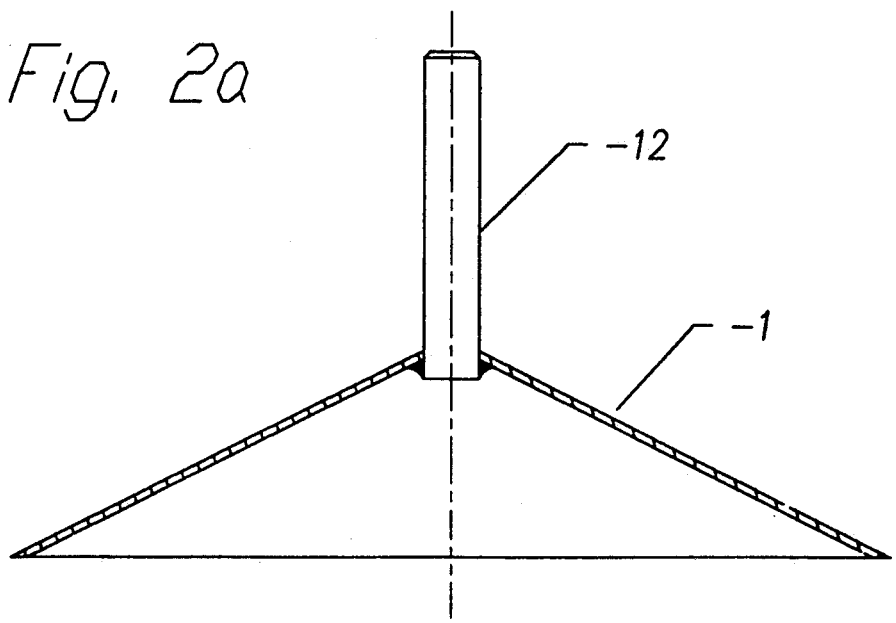
FIG. 2a: is a cross section of the distribution cone assembly of FIG. 2.

FIG. 2 and 2a is a plane view and cross section of cone 1 having a round shaft 12 permanently attached at it's apex.

Figure 3:
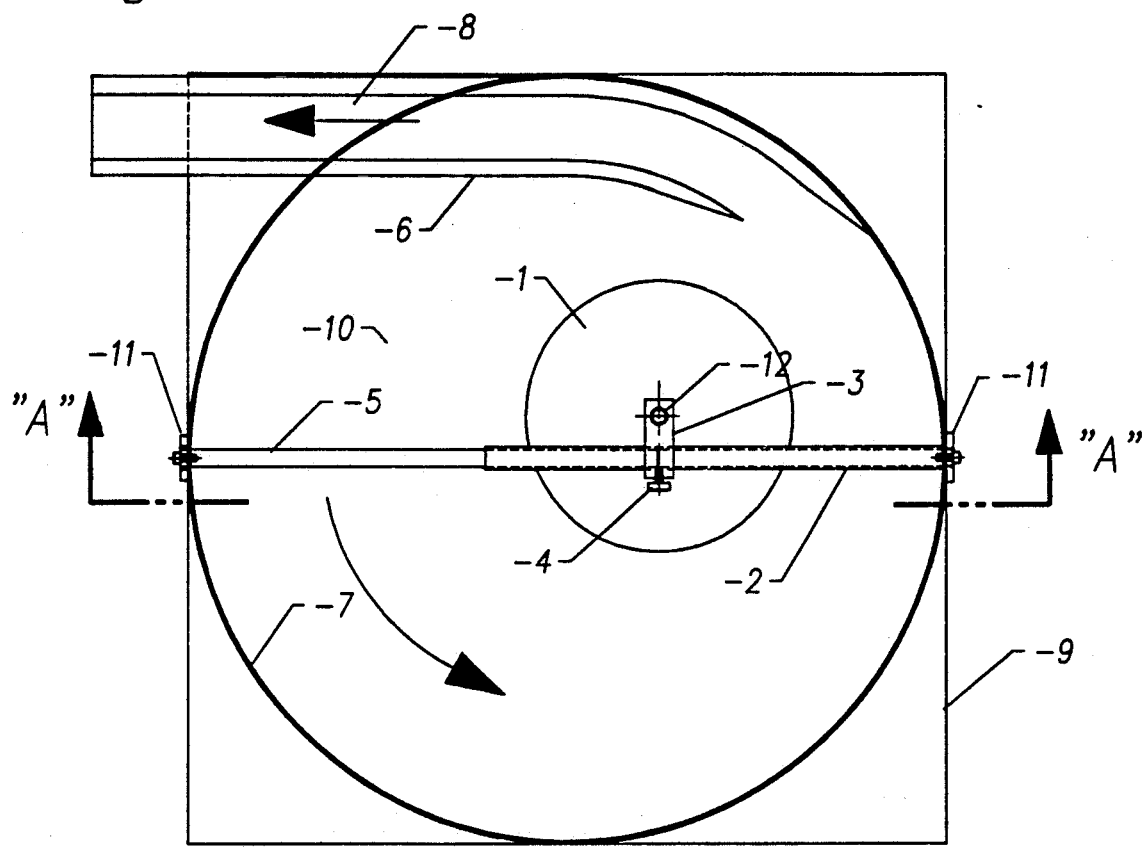
FIG. 3: is a the plan view of a typical installation of the distribution cone in a rotary feed table.
Figure 3A:
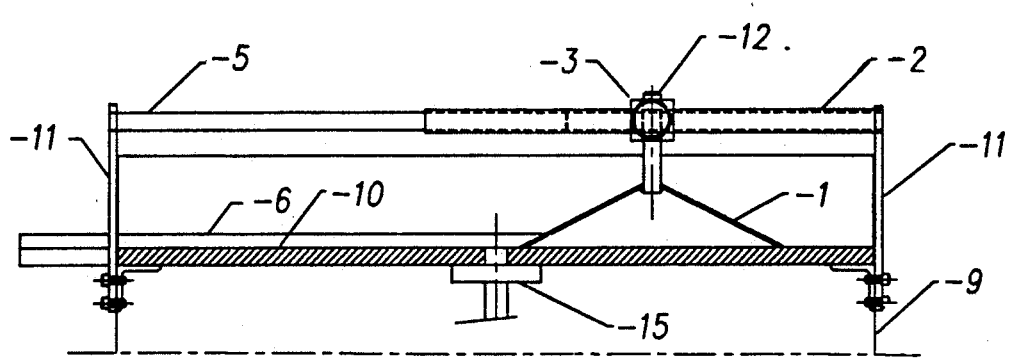
FIG. 3a: is the cross section "A"—"A" of the plan view.

FIG. 3 and 3'a, shows in a plan view and sectional view a representative position of the cone assembly that will urge parts to the periphery of rotating disk lo along the skirt 7 and out the exit track 8 when drive shaft 15 turns rotating disk 10. It further shows cone 1 resting on the surface of rotating disk 10.

Figure 4:
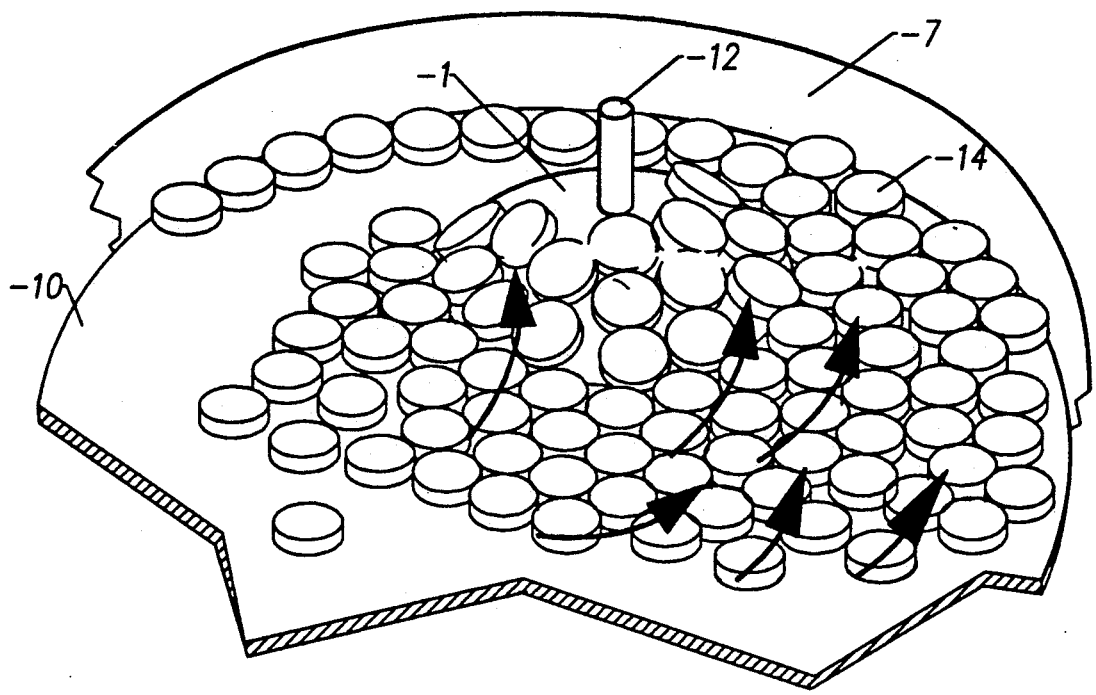
FIG. 4: is a depiction of typical parts being urged to the periphery of the feed table and the excess parts riding over the distribution cone without jamming.

FIG. 4, shows typical parts 14 urged over and along the periphery of cone 1 to skirt 7 with any excess parts sliding up and over the elevated smooth surface of cone 1 without causing damage or jamming.

Figure 5:
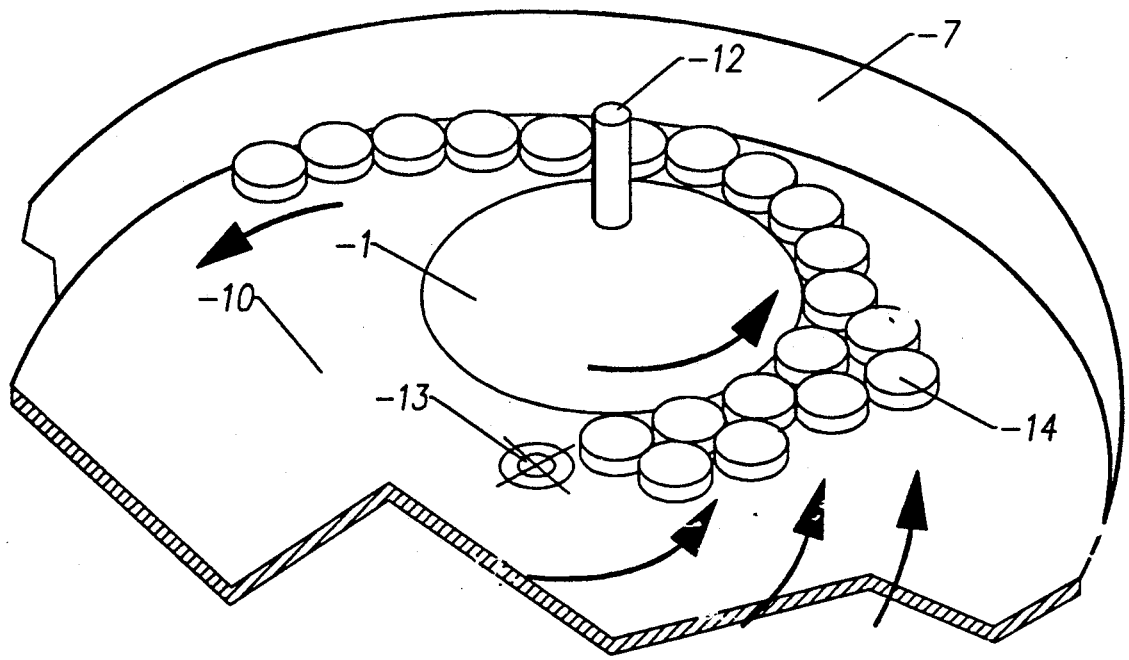
FIG. 5: is a depiction of only a view parts being urged to the periphery of the feed table.

FIG. 5, shows the action by cone 1 of urging all parts 14 from central axis 13 to the periphery of disk 10 and to skirt 7.

Although the invention is described with respect to a preferred embodiment, modifications thereto will be apparent to those skilled in the art. Therefore, the scope of the invention is to be determined by reference to the claims which follow.

I claim:

1. Cone assembly urging parts to the periphery of a rotary feed table, comprising:
   a cone assembly having a shaft attached at its apex;
   a bearing block mounted slidingly on a tube or bar;
   a bar or tube mounted to end pieces that fasten to the rigid base of a rotary feed table; and a means of fixing the bearing block to the tube or bar preventing the cone assembly from translating on the feed table.

2. The cone assembly as recited in claim 1, where the round shaft is affixed at the apex of the cone is made from metal or a plastic material in one or two piece construction.

3. The cone assembly as recited in claim 1, where the shaft may be affixed to the bearing block extending downward and the cone having a hole at its apex being free to rotate and move axially but not radially.

4. The cone assembly as recited in claim 1, wherein the single tube or bar is supported by an L-shaped bracket, having either a round bar or having a tube rigidly mounted to end plates with the bar fitting inside the tube allowing lateral adjustment.

5. The cone assembly as recited in claim 1, wherein the bar or tube may have the bearing block mounted at a fixed location.

6. The cone assembly as recited in claim 1, wherein the bearing block is fixed to a support above the rotary feed table preventing translation of the cone assembly on said feed table.

7. The cone assembly as recited in claim 1, wherein the bearing block uses a hole permitting a shaft to move freely axially and rotationally.

8. The cone assembly as recited in claim 1, wherein the edges of the cone are sharp or slightly rounded allowing different parts to slide onto the sloped sides without sustaining damage.

* * * * *